Oct. 31, 1944.  R. M. HEINTZ ET AL  2,361,842
ARMATURE CONSTRUCTION
Filed Nov. 18, 1942   2 Sheets-Sheet 1
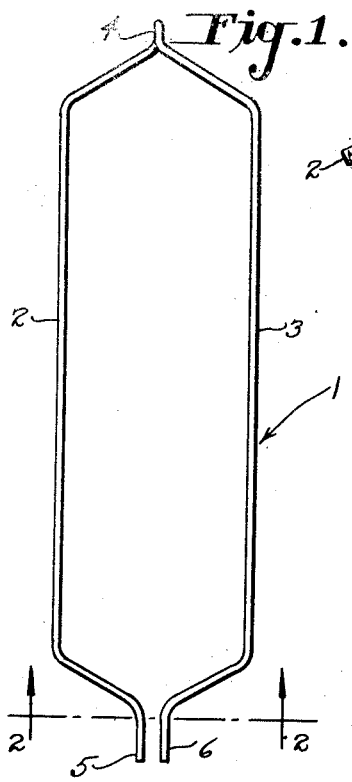
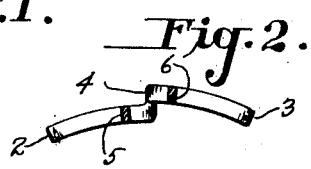
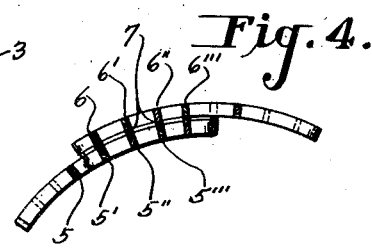
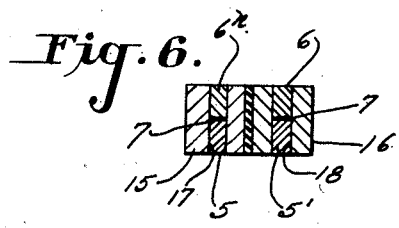
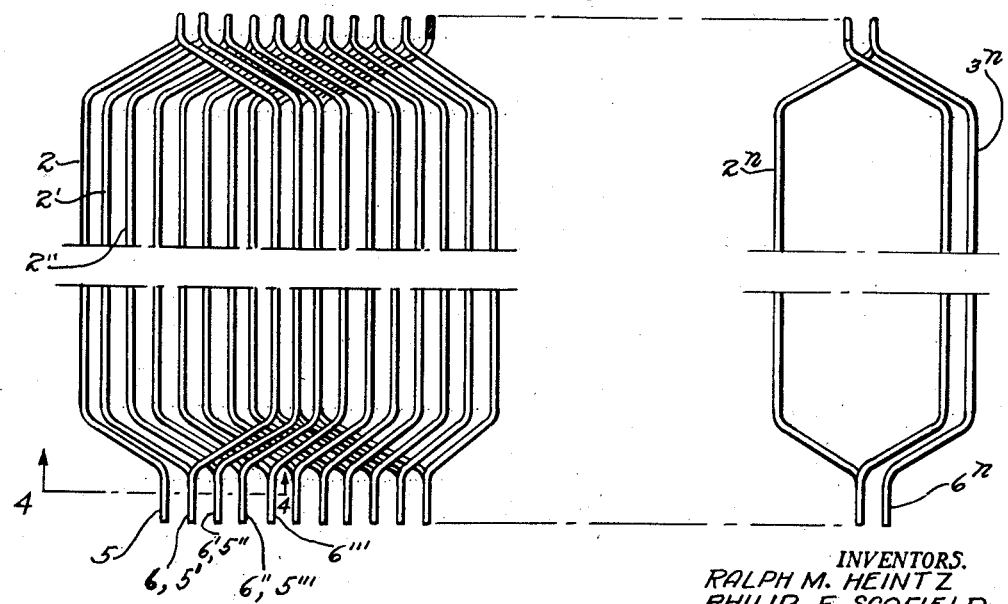
INVENTORS.
RALPH M. HEINTZ
PHILIP F. SCOFIELD.
BY
ATTORNEY.

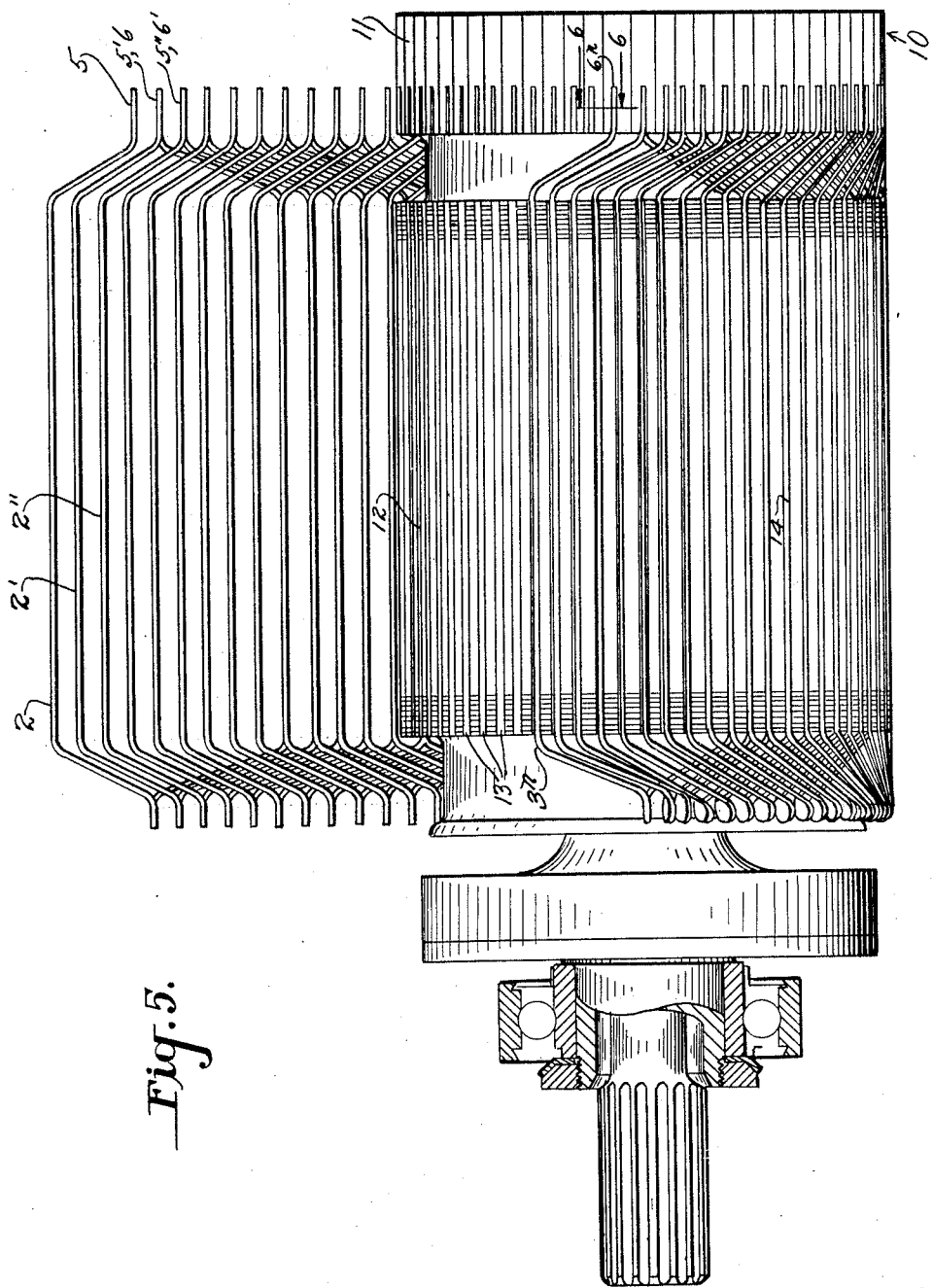

Patented Oct. 31, 1944

2,361,842

UNITED STATES PATENT OFFICE 2,361,842

ARMATURE CONSTRUCTION

Ralph M. Heintz, Cleveland, and Philip F. Scofield, Cleveland Heights, Ohio, assignors to Jack & Heintz, Inc., Bedford, Ohio, a corporation of Ohio Application November 18, 1942, Serial No. 466,024

5 Claims. (Cl. 171—206)

The present invention relates to improvements in armature construction for electrical machines, and is directed particularly to improvements in the fabrication and installation of armature conductors.

In conventional direct current armature construction individual conductor elements are customarily placed one by one in the proper slots in a prepared armature core with the free ends of each conductor element extending from the core. The conductor ends are then clipped off to the proper lengths and soldered into slots in the commutator bars. To avoid damage to the armature the soldering of conductors has necessarily been done heretofore with a so-called "soft," or low melting point, solder at a temperature of approximately 500° F. This prior art practice has proved satisfactory and has been generally accepted for what may be called conventional machines, but it is found to impose certain limitations on machines of special design for certain purposes. The trend in aircraft generators, for example, is toward ever higher outputs without corresponding concessions being made in size and weight limitations, resulting in higher loading and higher operating temperatures. In attempting to make high output generators which will meet aircraft requirements much trouble has been experienced through failure, or partial failure, of soldered armature connections. With higher current ratings and higher operating temperatures the soldered connections become critical points of weakness, the fault usually occurring first in the bond of the lower conductor where there are two conductors in each commutator slot. It is difficult to obtain a free flow of the solder about the conductor end in the bottom of the slot, the difficulty being greater with the use of higher melting point, or "harder" solders. The bond may be adequate to pass certain tests but may cover insufficient area to continuously carry the rated current without producing local resistance heating. The development of such a hot spot frequently melts out a portion of the solder, further reducing the cross sectional area of the electrical path and aggravating the condition to the point where damage to the armature may occur and certain armature conductors may be rendered ineffective. Such a condition tends to be progressive and is likely to remain unnoticed until evidenced by serious damage or inadequate performance.

Attempts to overcome the difficulty by merely using a harder solder do not cure the weakness but often aggravate it because of the increased difficulty of heating the bottom of the slot to flow a hard solder without damaging the armature. Any reduction in the cross sectional area of the solder part of the electrical circuit acts as a resistance heating element tending to progressively melt out the remaining solder, and once this action is started it may be just as effective with a hard solder as with a soft solder.

The general object of the present invention is to provide an improved armature construction and method of construction to overcome the above difficulties and weaknesses.

A specific object is to provide an improved method of making an armature whereby the bonding together of the conductor elements forming the armature winding is accomplished before the winding is applied to the armature.

A further object is to provide a method of making a continuous preformed armature conductor of lap wound configuration to fit an armature core.

A further object is to provide, as a new article of manufacture, a complete preformed armature winding capable of application to a slotted core.

A still further object is to provide an improved armature construction wherein the winding comprises a single, continuous preformed conductor.

Additional objects and advantages will become apparent to those skilled in the art as the description proceeds in connection with the accompanying drawings in which:

Figure 1 is a plan view of a single conductor element preformed to fit predetermined conductor slots in an armature core.

Figure 2 is a view taken on the line 2—2 of Figure 1.

Figure 3 is a plan view of a plurality of conductor elements bonded together to form a single conductor lap winding, the winding being laid out on a flat surface.

Figure 4 is a view taken on the line 4—4 of Figure 3;

Figure 5 is a side view of an armature core showing a manner of applying applicants' preformed continuous conductor winding; and Figure 6 is an enlarged sectional view through a pair of conductor slots, taken on the line 6—6 of Figure 5.

In Figure 1 is shown a single conductor element I preformed from rectangular bar stock to fit predetermined slots in an armature core. The element is of general loop form having parallel legs 2 and 3 to be carried in the core slots, a return bend 4 constituting an end turn, and free ends 5 and 6 adapted for insertion in the conductor slots in the commutator bars. As shown in Figure 2, the leg 3 and end 6 are offset above the leg 2 and end 5 so that a plurality of elements 1 may be disposed in overlapping relation to form a lap winding wherein each end 5 is adapted to occupy the bottom of a commutator slot, and each end 6 is adapted to occupy the upper portion of a slot.

By arranging a plurality of elements 1 as shown in Figure 3 they may be bonded together to form a continuous conductor armature winding having a lap wound configuration. In the present embodiment a bonding material consisting of a hard solder indicated by the numeral 7 unites the upper edge surface of each end 5 with the lower edge surface of superposed end 6 of the next element. Thus, in Figure 4 the bonds 7 are seen to provide a continuous conductor establishing a circuit from 5 to 6''', etc., through 6, 5', 6', 5'', 6'', and 5''', the arrangement being continued until there are upper and lower conductor legs 2 and 3 for each armature slot, and upper and lower conductor ends 5 and 6 for each commutator slot. When the arrangement of conductor elements is completed in this manner there results an article of manufacture comprising a complete, preformed armature winding in a lap wound configuration adapted for application to an armature core. The arrangement and soldering of the elements may conveniently be carried out in a jig, the advantage being that there is no limitation on the temperatures involved, so long as the conductors themselves are not burned. Satisfactory results have been obtained with a solder having a melting point of 1200° F. Welding may be employed, instead of hard soldering, if the conductors are made of a weldable material.

The complete, preformed winding shown laid out flat in Figure 3 may be applied to a slotted armature by wrapping it around and inserting the conductors in the proper slots progressively, starting at either the end 2 or the end $3n$. For instance, the single lower conductor legs 2, 2', 2'' may be inserted first, followed by the pairs of conductor legs, one pair to a slot, and finishing with the last lower leg in the bottom of the last empty slot and the last upper leg $3n$ in the top of the last available slot already occupied only by a single lower conductor.

Alternatively and preferably, the conductor may be wrapped on from the other end, beginning with $3n$. This procedure is illustrated in Figure 5 wherein the numeral 10 designates an armature generally, having a commutator 11 and a laminated core 12 with conductor slots 13. In this case the end conductor legs immediately preceding and including the extreme end leg $3n$ are brought into position but are not immediately inserted into their slots. Instead, a beginning is made at some slot near the end, such as indicated by the numeral 14. The conductor legs are then inserted in pairs around the core, Figure 5 showing the installation started on the front side and completed on the bottom and back sides with the free end 2 about to be brought over the top and down the upper front side. To finish the installation the beginning end portion between 14 and $3n$ is lifted up and the single lower conductor legs 2, 2', 2'', etc., are inserted thereunder.

As the installation of the conductor legs 2 and 3 in the core slots progresses as described above, the bonded ends 5, 6—5', 6'—5'', etc., are placed in their respective commutator slots, and when the installation has thus been completed around the core the end $6n$ will be on the end 5. These two ends and adjacent overlying conductors may then be temporarily pried up out of their commutator slots and the said ends hard soldered or otherwise bonded. This bond completes the circuit through all the armature turns in series, whereupon the ends may all be properly seated in their commutator slots for final soldering to the commutator bars.

Figure 6 is an enlarged sectional view showing a pair of adjacent commutator segments 15 and 16 having slots 17 and 18 with the bonded ends 5 and $6n$ and 5', 6 in place. An important feature of the invention will be apparent from this figure. As has been previously explained, one of the defects of conventional construction to be overcome by the present invention is the difficulty of adequately soldering the lower conductor end in the bottom of each commutator slot. Lack of sufficient bond to carry the current in the lower conductor end produces local heating often sufficient to melt the solder and even intensify the heating. This problem is entirely avoided in applicants' construction because a good bond is assured between the upper and lower conductor ends prior to inserting these ends into the commutator slot, and the soldering of the upper conductor end in the upper part of the slot is a relatively simple matter. In Figure 6, for instance, should there be no bond whatever between the end 5 and the slot walls there would still be adequate electrical and mechanical bonding through the hard solder, or weld, material 7, the end $6n$, and the bond between the end $6n$ and the upper walls of the slot. Ordinarily, with a reasonably good bond around the end 5, the path through 7 and $6n$ to the upper side walls of the slot 17 would of course function merely as a parallel path for the current. Conversely, it is also apparent that should the upper bond become defective the lower bond is normally adequate to perform the necessary electrical and mechanical functions, since the individual conductor elements are united into a continuous conductor. The bond to the commutator slots may also comprise a so-called "hard solder" but must have a temperature of application which will not affect or loosen the bonds 7.

The present method and construction have been described with specific reference to a high output, light weight generator for large aircraft, but this embodiment has been selected primarily for the purpose of illustrating the principles of the invention, and not in a limiting sense. The present disclosure may be applied by one skilled in the art to a variety of core or field structures, whether revolving or stationary, and is not limited to use in generators or motors; it may be applied to any kind of electrical energy translating device wherein the problems outlined herein obtain, or for other purposes.

Various changes and modifications will occur to those skilled in the art, and it is intended that all such variations be included in the invention. The invention is to be limited only by the appended claims and the scope of the prior art.

We claim:

1. In an armature construction, a core, a commutator, a plurality of conductor slots in said core, conductor elements in said slots, bonding means uniting said conductor elements one to another capable of withstanding a relatively high predetermined temperature, and additional means for bonding said conductor elements to said commutator at a temperature considerably less than said predetermined temperature so as not to affect said first bonding means, and to avoid subjecting said armature to said relatively high temperature.

2. In an armature construction, a core, a commutator, a plurality of conductor slots in said core, conductor elements in said slots, bonding means uniting said conductor elements one to another capable of withstanding a temperature of 1000° F., and additional means for bonding said conductor elements to said commutator at a temperature less than 1000° F., to avoid subjecting said armature to said higher temperature.

3. The method of making an armature comprising preforming a plurality of conductor elements into coils to fit predetermined slots in an armature core, integrally uniting said coils to form a continuous lap winding having two free ends, applying said winding to said slots in sequential order around said core, and then integrally uniting the said free ends.

4. The method of making an armature winding comprising preforming a plurality of conductor elements into coils to fit predetermined slots in an armature core, and integrally uniting said coils in the form of a complete lap winding capable of application to said core.

5. The method of making an armature comprising pre-forming a plurality of conductor elements to fit predetermined slots in an armature core, uniting said elements with a high temperature bonding means to form a complete winding for said armature, applying said winding to said core slots with end portions in bonding relation with commutator segments, and bonding said end portions to said segments with a relatively lower temperature bonding means to avoid loosening of said high temperature bonding means and damage to said armature.

RALPH M. HEINTZ.
PHILIP F. SCOFIELD.